H. E. MATTHEUS.
TOOL HOLDER.
APPLICATION FILED JUNE 26, 1912.
1,063,050.
Patented May 27, 1913.
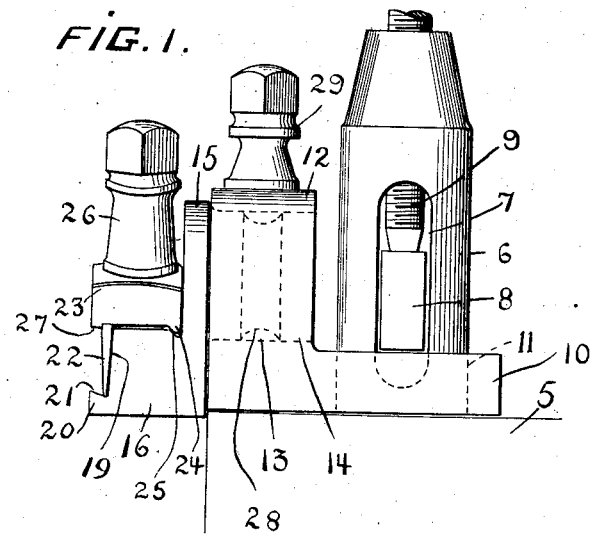
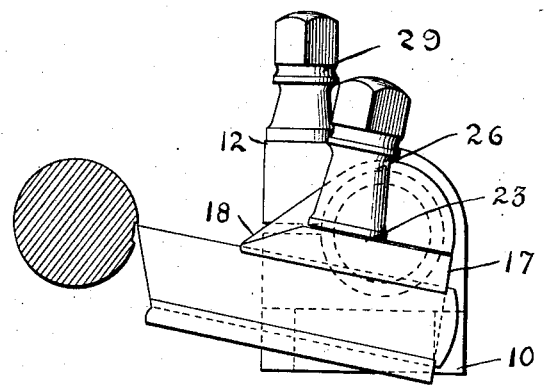
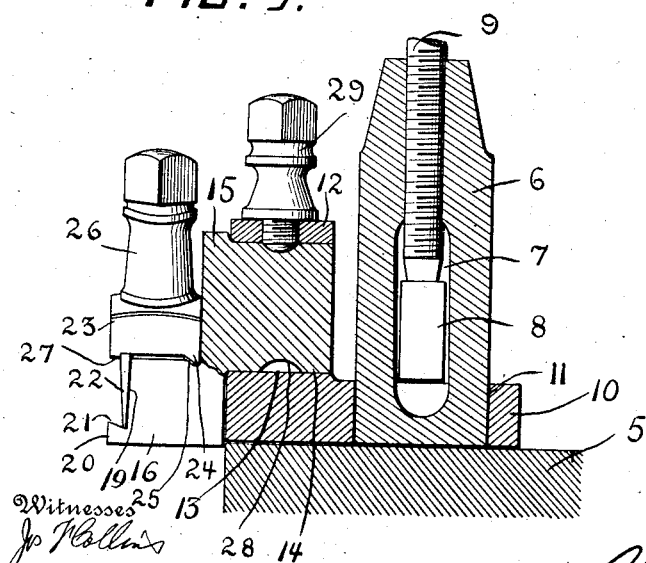
Inventor
H. E. Mattheus
By Victor J. Evans
Attorney

UNITED STATES PATENT OFFICE.

HARRY E. MATTHEUS, OF BIRMINGHAM, ALABAMA.

TOOL-HOLDER.

1,063,050.      Specification of Letters Patent.      Patented May 27, 1913.

Application filed June 26, 1912. Serial No. 706,010.

*To all whom it may concern:*

Be it known that I, HARRY E. MATTHEUS, a citizen of the United States, residing at Birmingham, in the county of Jefferson and State of Alabama, have invented new and useful Improvements in Tool-Holders, of which the following is a specification.

The invention relates to tool holders and more particularly to the class of automatic throw-off tool holders for lathes or other machines.

The primary object of the invention is the provision of a tool holder in which the clamping plate is formed with a depending projection on its side opposite the tool so as to engage in a depression in the supporting member whereby on the clamping of the tool the latter will be drawn firmly against the said supporting member so as to securely clamp the tool and prevent lateral displacement thereof during the working of the same in the lathe or other machine.

Another object of the invention is the provision of a tool holder in which the supporting member for the tool is formed with a laterally extending trunnion so as to permit the turning of the said member should the tool become seized by a chip in the work while severing the same by the tool, thereby avoiding the breaking of the latter or the damaging of the same.

A further object of the invention is the provision of a tool holder in which the tool supporting member is adjustably mounted so that the tool can be accurately adjusted with respect to the work and also that will avoid the seizure thereof by the jamming of the tool between the walls of the cut in a piece of work during the operation of the machine.

A still further object of the invention is the provision of a tool holder wherein the same can be readily and conveniently clamped upon the tool post of the slide rest of a lathe without the possibility of the said holder working loose or becoming laterally displaced during the operation of the machine.

A still further object of the invention is the provision of a tool holder which is simple in construction, thoroughly reliable and efficient in its operation, capable of being mounted upon the tool rest of a lathe or other machine without requiring the altering or changing of the rest and one which is inexpensive in manufacture.

With these and other objects in view the invention consists in the construction, combination and arrangement of parts as will be hereinafter more fully described, illustrated in the accompanying drawing, and pointed out in the claims hereunto appended.

In the drawing: Figure 1 is a fragmentary side elevation of a tool rest showing the tool post and the tool holder constructed in accordance with the invention mounted thereon. Fig. 2 is an end elevation thereof showing the cutting tool in position for severing a piece of work. Fig. 3 is a vertical longitudinal section view through the tool holder.

Similar reference characters indicate corresponding parts throughout the several views in the drawing.

Referring to the drawings by numerals, 5 designates generally a tool rest of a lathe or other machine which is of the ordinary well-known construction, and in which is detachably mounted the vertical tool post 6 which is formed with a central vertically disposed elongated tool receiving slot 7 as usual, in which is engaged the tool 8 of the desired type, the latter being detachably secured in the slot 7 by means of the binding screw 9 threaded centrally through the tool post 6 in the ordinary well-known manner.

The tool holder comprises a base 10 which is adapted to be superimposed upon the tool rest 5 and is engaged between its top face and the bottom edge of the tool 8 when inserted and fastened within the tool post 6, thus securely mounting the said base 10 in position upon the tool rest, the said post 10 being formed with a circular opening 11 of a size corresponding to the cross-sectional diameter of the lower end of the tool post 6 for receiving the same whereby the said rest 10 may be engaged thereon.

Formed on and rising from one end of the base 10 is a vertical bearing 12 formed with a central transverse circular-shaped opening 13 in which is engaged a trunnion 14 integral with and projecting laterally from the vertical portion 15 of a tool supporting swinging member 16, the same being provided with a straight rear edge 17 and an inclined or beveled front edge 18, while formed in the outer side of the said member is a tool seat 19, providing an abutment rib or lip 20 formed with an inwardly beveled upper edge 21, the said rib or lip 20 being extended throughout the length of the member 16, and adapted to engage the beveled upper edge 21 is an ordinary cutting tool or blade 22 which is positioned in the seat 19 of the member 16 which is designed to support the same.

Mounted upon the top of the supporting member 16 is a clamping plate 23, the same being formed with an outwardly tapering depending projection 24 at its inner side which is coextensive with the said plate 23 and is engaged in a correspondingly shaped channel 25 formed in the top of the member 16 contiguous to the vertical portion 15 thereof. Rotatably mounted in the said plate 23 is a clamping screw 26 the same being adjustably engaged in the supporting member 16 for bringing the clamping plate 23 into clamping relation to the tool or blade 22 when mounted in the seat 19 in the supporting member.

Formed on the inner face of the clamping plate 23 at the outer side edge thereof is a depending gripping flange 27 which latter engages the outer face of the tool or blade 22, so that when the clamping plate 23 is forced downwardly upon the supporting member 16 by the clamping screw 26, the projection 24 will be forced in the channel or groove 25 thus causing the said clamping plate 23 to be moved inwardly laterally of the member 26 thereby the gripping flange 27 will exert an inward pressure upon the tool or blade 22 drawing it snugly against the outer side of the member 16 in the seat 19 therein, and also holding the said tool or blade 22 firmly down against the beveled upper edge 21 of the lip or rib 20 on the outer side of the supporting member 16, thus securely clamping the blade or tool thereon, so as to avoid lateral displacement of the said blade or tool during the working of the said lathe or machine. The front edge 18 of the supporting member 16 is extended beyond the front end of the clamping plate 23 which enables the tool or blade to cut off round stock whose radius nearly equals the height of the blade or tool used without any overhang of the blade. Formed on the trunnion 14 medially thereof is an annular groove 28, in which is engaged the inner end of a binding screw 29 threaded through the bearing 12 at the top thereof, the screw 29 being designed to fasten the trunnion 14 in the bearing with sufficient security to support the member 16 without permitting the same to turn when the blade or tool 22 is subjected to a heavier cutting action than such tools are ordinarily subjected to, but in event of the chip seizing or snagging the tool or blade 22 will be automatically swung downwardly away from the work on the turning of the supporting member 16, so as to avoid the snag or the like. The tool supporting member 16 will be caused to swing downwardly by reason of the fact that the center of the trunnion is positioned a suitable distance above the cutting face of the blade or tool 22 when mounted in the supporting member and in this manner the snag or the like will be allowed to pass without damage to the blade or any part of the tool holder.

The adjustable mounting of the tool supporting member 16 facilitates the proper adjustment of the tool or blade to the proper elevation for cutting in lathes or machines with varying heights of tool rests. It is of course understood that by tightening the binding screw 29 the tool supporting member 16 will be prevented from turning and this is done when operating upon hard stock.

From the foregoing description, taken in connection with the accompanying drawing, it is thought that the construction and operation of the invention will be clearly understood, and therefore, a further explanation has been omitted.

What is claimed is:—

1. A tool holder comprising a base adapted to be clamped to a tool rest of a lathe or other machine, a bearing rising from said base, a swinging tool supporting member connected with said bearing and having a tool seat in its outer side, a clamping plate carried by said member and engageable with a tool when disposed within the seat in said member for holding the same, and means on the clamping plate and engageable with the member for causing inward lateral movement of the said clamping plate for firmly forcing a tool in the seat in said member.

2. A tool holder comprising a base adapted to be clamped to a tool rest of a lathe or other machine, a bearing rising from said base, a swinging tool supporting member connected with said bearing and having a tool seat in its outer side, a clamping plate carried by said member and engageable with a tool when disposed within the seat in said member for holding the same, means on the clamping plate and engageable with the member for causing inward lateral movement of the said clamping plate for firmly forcing a tool in the seat in said member, and means for binding the swinging supporting member in the bearing.

3. A tool holder comprising a base adapted to be clamped to a tool rest of a lathe or other machine, a bearing rising from said base, a swinging tool supporting member connected with said bearing and having a tool seat in its outer side, a clamping plate carried by said member and engageable with a tool when disposed within the seat in said member for holding the same, means on the clamping plate and engageable with the member for causing inward lateral movement of the said clamping plate for firmly forcing a tool in the seat in said member, means for binding the swinging supporting member in the bearing, and means for adjusting the clamping plate on the said supporting member.

4. A tool holder comprising a base adapted to be clamped to a tool rest of a lathe or other machine, a bearing rising from said base, a swinging tool supporting member connected with said bearing and having a tool seat in its outer side, a clamping plate carried by said member and engageable with a tool when disposed within the seat in said member for holding the same, means on the clamping plate and engageable with the member for causing inward lateral movement of the said clamping plate for firmly forcing a tool in the seat in said member, means for binding the swinging supporting member in the bearing, and means for adjusting the clamping plate on the said supporting member, the said supporting member being extended forwardly beyond the clamping plate.

5. A tool holder comprising a base adapted to be clamped to a tool rest of a lathe or other machine, a bearing rising from said base, a swinging tool supporting member connected with said bearing and having a tool seat in its outer side, a clamping member carried by said member and engageable with a tool when disposed within the seat in said member for holding the same, means on the clamping plate and engageable with the member for causing inward lateral movement of the said clamping plate for firmly forcing a tool in the seat in said member, means for binding the swinging supporting member in the bearing, means for adjusting the clamping plate on the said supporting member, the said supporting member being extended forwardly beyond the clamping plate, and an inwardly beveled abutment lip formed on the supporting member at the lowermost portion of the seat therein for coöperation with the tool when engaged in the seat.

6. A tool holder comprising a base adapted to be clamped to a tool rest of a lathe or other machine, a bearing rising from said base, a swinging tool supporting member connected with said bearing and having a tool seat in its outer side, a clamping member carried by said member and engageable with a tool when disposed within the seat in said member for holding the same, means on the clamping plate and engageable with the member for causing inward lateral movement of the said clamping plate for firmly forcing a tool in the seat in said member, means for binding the swinging supporting member in the bearing, means for adjusting the clamping plate on the said supporting member, the said supporting member being extended forwardly beyond the clamping plate, an inwardly beveled abutment lip formed on the supporting member at the lowermost portion of the seat therein for coöperation with the tool when engaged in the seat, and a gripping flange depending from the clamping plate and engageable with a tool when in the seat to prevent lateral displacement of said tool.

In testimony whereof I affix my signature in presence of two witnesses.

HARRY E. MATTHEUS.

Witnesses:
R. A. WITHERILL,
C. D. ALLIS.

---

Copies of this patent may be obtained for five cents each, by addressing the "Commissioner of Patents Washington, D. C."